United States Patent
Guo et al.

(10) Patent No.: US 11,295,157 B2
(45) Date of Patent: Apr. 5, 2022

(54) IMAGE PROCESSING METHOD AND INFORMATION PROCESSING DEVICE

(71) Applicant: FUJITSU LIMITED, Kawasaki (JP)

(72) Inventors: Song Guo, Beijing (CN); Fei Li, Beijing (CN)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 16/717,281

(22) Filed: Dec. 17, 2019

(65) Prior Publication Data
US 2020/0193211 A1    Jun. 18, 2020

(30) Foreign Application Priority Data

Dec. 18, 2018   (CN) .......................... 201811549825.3

(51) Int. Cl.
*G06K 9/46*        (2006.01)
*G06T 17/00*       (2006.01)

(52) U.S. Cl.
CPC ................ *G06K 9/46* (2013.01); *G06T 17/00* (2013.01)

(58) Field of Classification Search
CPC ......... G06T 17/00; G06T 11/00; G06T 15/00; G06T 15/08; G06T 19/00; G06T 2207/30201; G06K 9/00208; G06K 9/46; G06K 9/6209; G06K 9/6211; G06K 9/6262; G06K 9/00281; G06K 9/00268
USPC ........................................................ 345/419
See application file for complete search history.

(56) References Cited

U.S. PATENT DOCUMENTS

| 2007/0201729 A1 | 8/2007 | Yuasa et al. |
| 2007/0217683 A1 | 9/2007 | Kinoshita |
| 2012/0113106 A1* | 5/2012 | Choi ............... G06T 11/00 345/419 |

(Continued)

FOREIGN PATENT DOCUMENTS

| CN | 107045631 A | 8/2017 |
| WO | 2016/030305 A1 | 3/2016 |

OTHER PUBLICATIONS

Zhang, Lei, Sen Wang, and Dimitris Samaras. "Face synthesis and recognition from a single image under arbitrary unknown lighting using a spherical harmonic basis morphable model." 2005 IEEE Computer Society Conference on Computer Vision and Pattern Recognition (CVPR'05). vol. 2. IEEE, 2005 (Year: 2005).*

(Continued)

*Primary Examiner* — Jitesh Patel
(74) *Attorney, Agent, or Firm* — Westerman, Hattori, Daniels & Adrian, LLP

(57) ABSTRACT

An image processing method and an information processing device are provided. The information processing device may include a processor, which may be configured to: construct a three-dimensional face model based on a face object in a two-dimensional image; determine a correspondence between the constructed three-dimensional face model and the face object in the two-dimensional image; determine, based on the correspondence, an area of interest of a key point in the two-dimensional image using an area of interest near a corresponding key point in the three-dimensional face model; and extract an image feature from the determined area of interest in the two-dimensional image as an image feature of the key point.

13 Claims, 11 Drawing Sheets

(56) References Cited

U.S. PATENT DOCUMENTS

| | | | |
|---|---|---|---|
| 2016/0055368 A1* | 2/2016 | Cao | G06K 9/6206 |
| | | | 382/195 |
| 2016/0148425 A1* | 5/2016 | Hwang | G06K 9/00281 |
| | | | 345/419 |
| 2016/0154994 A1* | 6/2016 | Kim | G06K 9/00208 |
| | | | 382/118 |
| 2016/0205382 A1* | 7/2016 | Chen | G06K 9/6265 |
| | | | 382/203 |
| 2018/0300927 A1* | 10/2018 | Hushchyn | H04L 65/602 |
| 2019/0122376 A1* | 4/2019 | Xi | G06T 11/00 |
| 2020/0342210 A1* | 10/2020 | Wang | G06K 9/621 |

OTHER PUBLICATIONS

Blanz, Volker, and Thomas Vetter. "Face recognition based on fitting a 3d morphable model." IEEE Transactions on pattern analysis and machine intelligence 25.9 (2003): 1063-1074 (Year: 2003).*

Jourabloo, Amin et al., "Pose-Invariant Face Alignment via CNN-Based Dense 3D Model Fitting", International Journal of Computer Vision., vol. 124, No. 2, Apr. 19, 2017, pp. 187-203; Cited in European Extended Search Report dated Apr. 24, 2020. (17 pages).

Extended (Supplementary) European Search Report dated Apr. 24, 2020, issued in counterpart EP Application No. 19216455.6. (11 pages).

Paysan et al., "A 3D Face Model for Pose and Illumination Invariant Face Recognition," Sixth IEEE International Conference on Advanced Video and Signal Based Surveillance, IEEE, pp. 296-301 (2009).

Cao et al., "FaceWarehouse: a 3D Facial Expression Database for Visual Computing," IEEE Transactions on Visualization and Computer Graphics, vol. 20, No. 3, pp. 413-425 (2014).

* cited by examiner

IMAGE PROCESSING METHOD AND INFORMATION PROCESSING DEVICE

CROSS-REFERENCE TO RELATED APPLICATIONS

This application claims priority to Chinese Patent Application No. 201811549825.3, titled "IMAGE PROCESSING METHOD AND INFORMATION PROCESSING DEVICE", filed on Dec. 18, 2018 with the Chinese Patent Office, which is incorporated herein by reference in its entirety.

FIELD

The present disclosure generally relates to the technical field of image processing, and in particular to an image processing method for extracting an image feature from a two-dimensional image including a face object, and an information processing device for performing the image processing method.

BACKGROUND

With the development of image processing technologies, many face-related tasks, such as face recognition, face attribute classification and three-dimensional face reconstruction, are attracting more and more attentions and are involved in a wide variety of applications.

In the face-related tasks, it is generally required to perform various pre-processes on a series of predetermined key points (such as canthi, a nose tip, mouth corners and a chin center), for example, a pre-process of extracting an image feature related to a key point, so as to perform subsequent processes. Although there are many algorithms in the field for extracting the image feature related to the key point, most of the algorithms cannot satisfy requirements in a real-life scenario, because an expression and a posture of a human face as well as a change of an external environment may produce influences on a face image.

Therefore, it is required to provide an improved method for extracting an image feature related to a key point from a two-dimensional image including a human face (that is, a face object).

SUMMARY

A brief summary of the present disclosure is given hereinafter, so as to provide basic understanding in some aspects of the present disclosure. It is to be understood that this summary is not an exhaustive overview of the present disclosure. It is neither intended to identify key or critical parts of the present disclosure, nor intended to define the scope of the present disclosure. It merely functions to present some concepts of the present disclosure in a simplified form as a prelude to a more detailed description stated later.

In view of the need for improving the conventional image processing method, an object of the present disclosure to provide an image processing method for extracting an image feature from a two-dimensional image including a face object, which can improve the accuracy of feature extraction.

According to an aspect of the present disclosure, an image processing method is provided, which includes: constructing a three-dimensional face model based on a two-dimensional shape of a face object in a two-dimensional image, said two-dimensional shape comprising a plurality of key points; determining a correspondence between the constructed three-dimensional face model and the face object in the two-dimensional image; determining, based on the correspondence, an area of interest of a key point in the two-dimensional image using an area of interest near a corresponding key point in the three-dimensional face model, and extracting an image feature from the determined area of interest in the two-dimensional image as the image feature of the key point in the two-dimensional image; establishing, based on the extracted image features of the key points, a current increment of the two-dimensional shape of the face object using a regressor which is obtained in advance, said increment indicating a displacement adjustment to be performed on positions of the key points comprised in the two-dimensional shape; and obtaining a current two-dimensional shape of the face object based on a previously obtained two-dimensional shape of the face object and the current increment of the two-dimensional shape of the face object, wherein steps of constructing a respective three-dimensional face model, determining a respective correspondence, determining a respective area of interest, extracting a respective image feature, establishing a respective current increment and obtaining a respective current two-dimensional shape are performed iteratively, until a predetermined iteration termination condition is satisfied.

According to another aspect of the present disclosure, an information processing device is further provided, which includes a processor configured to perform the image processing method as described above.

According to yet another aspect of the present disclosure, a program is provided, which causes a computer to perform the image processing method as described above.

According to still another aspect of the present disclosure, a storage medium is further provided, which stores machine readable instruction codes. The machine readable instruction codes may cause, when read and executed by a machine, the machine to perform the image processing method as described above.

According to various aspects of the embodiments of the present disclosure described above, the present disclosure may provide at least a beneficial effect of improving the accuracy of extracting an image feature of a key point in the two-dimensional image by using three-dimensional information contained in the two-dimensional image.

Such and other advantages of the present disclosure will become more apparent from the detailed description of the preferred embodiments of the present disclosure made in conjunction with the drawings.

BRIEF DESCRIPTION OF THE DRAWINGS

The present disclosure may be understood better with reference to the detailed description made in conjunction with the drawings in the following. The same or similar elements are indicated by the same or similar reference numerals throughout all the drawings. The drawings together with the following detailed description are incorporated into the specification and form a part of the specification, and serve to further illustrate the preferred embodiments of the present disclosure and to explain the principle and advantages of the present disclosure by way of example. In the drawings.

DETAILED DESCRIPTION OF EMBODIMENTS

Figure 1:
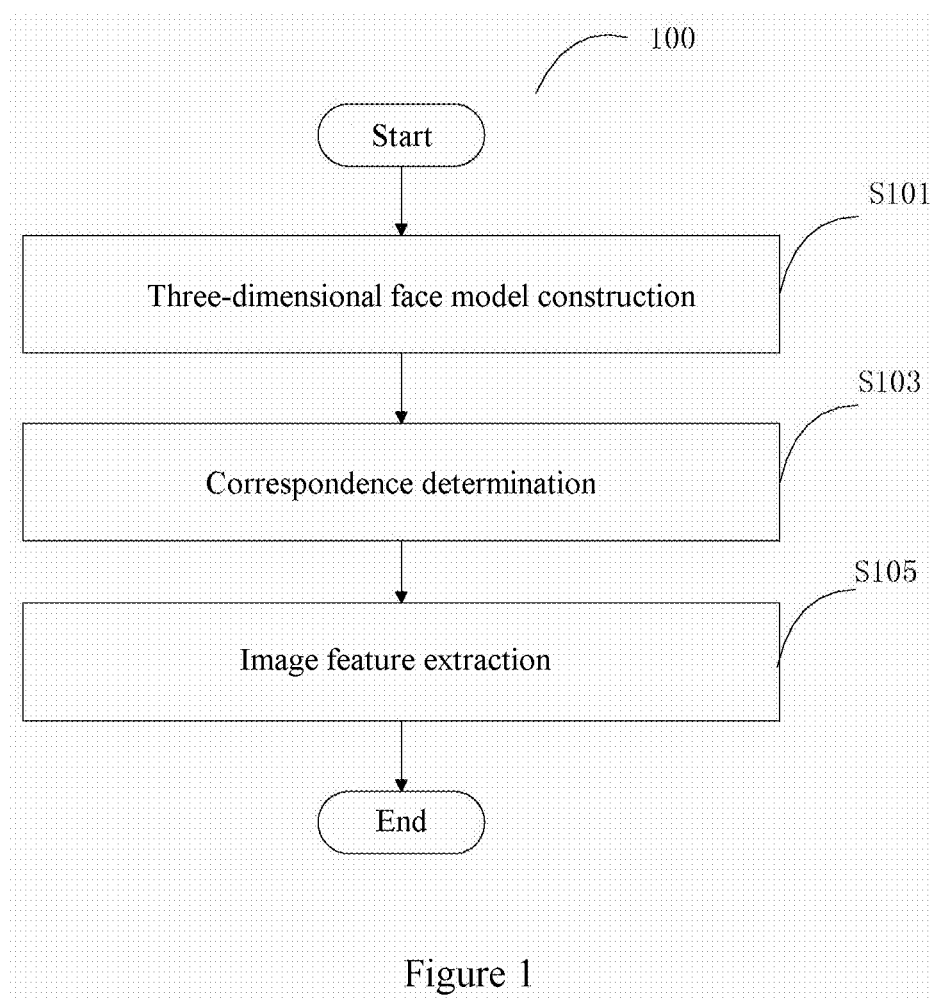
FIG. 1 is a flowchart schematically showing an example flow of an image processing method according to an embodiment of the present disclosure.

Exemplary embodiments of the present disclosure will be described below in conjunction with the drawings. For the sake of clarity and conciseness, not all the features of practical embodiments are described in the specification. However, it is to be understood that numerous embodiment-specific decisions shall be made during developing any of such actual embodiments so as to achieve the developer's specific goals, for example, to comply with system-related and business-related constraining conditions which will vary from one embodiment to another. Furthermore, it is also to be understood that although the development work may be very complicated and time-consuming, for those skilled in the art benefiting from the present disclosure, such development work is only a routine task.

It is further to be noted here that, to avoid obscuring the present disclosure due to unnecessary details, only the device structures and/or processing steps closely related to the solutions of the present disclosure are shown in the drawings, and other details less related to the present disclosure are omitted.

According to an aspect of the present disclosure, an image processing method is provided. FIG. 1 is a flowchart schematically showing an example flow of an image processing method 100 according to an embodiment of the present disclosure.

As shown in FIG. 1, the image processing method 100 may include a three-dimensional face model construction step S101, a correspondence determination step S103, and an image feature extraction step S105. In step S101, a three-dimensional face model is constructed based on a face object in a two-dimensional image. In step S103, a correspondence between the constructed three-dimensional face model and a face object in the two-dimensional image is determined. In step S105, an area of interest of a key point in the two-dimensional image is determined using an area of interest near a corresponding key point in the three-dimensional face model based on the correspondence, and an image feature is extracted from the determined area of interest in the two-dimensional image as the image feature of the key point in the two-dimensional image. The extracted image feature can be used in processes described later with respect to FIGS. 2 and 3, such as processes in an increment establishing step S207 of FIG. 2 and an increment establishing step S307 of FIG. 3.

As an example, the two-dimensional image to which the image processing method according to the embodiment of the present disclosure is applied may be any two-dimensional image including a face object (a human face). The face object may be a face of a human of any identity having any age, gender, race, and the like and may have any expressions and/or postures. Further, there may be various backgrounds in the two-dimensional image, for example, the two-dimensional image may be a photo image taken in a real-life scenario.

With the image processing method according to the embodiment, the two-dimensional image including the face object is processed such that three-dimensional information contained in the two-dimensional image is fully utilized, thereby improving the accuracy in extracting the image feature of the key point in the two-dimensional image.

More specifically, the key points of the face object and their features are important information that may be applied to various image processes related to faces. The key points may include, for example, canthi, eyebrows, a nose tip, mouth corners, and/or a chin center (or a center point of a chin), and the like. In a conventional process on a two-dimensional face image, a feature of each key point is directly extracted in a local area near the key point. The local area is usually determined as a circular or rectangular area centered on the key point. Since such local areas are determined without considering a specific condition of each key point (a position of the key point, a posture of a face, and the like), they may contain a lot of complex backgrounds, which may results in an inaccurate or even error feature of the key point. For the key point in a contour and a key point in a face with a large posture, the problem of an inaccurate feature is even more severe. With the method in this embodiment, a correspondence between a face object in the two-dimensional image and a three-dimensional face model is utilized: an area of interest in the three-dimensional face model is determined, and an area of interest in the two-dimensional image is determined accordingly, and then a feature is extracted from this area of interest in the two-dimensional image. Since there is no background area in the three-dimensional face model, the area of interest in the two-dimensional image that is determined using the area of interest in the three-dimensional model is simple and clean, so that a feature can be extracted from this area with high accuracy.

As an example, in the three-dimensional face model construction step S101, a model for the face object in the two-dimensional image may be constructed using an existing three-dimensional face model, for example, a three-dimensional deformation model (3DMM) or a three-dimensional point distribution model. In the present specification, the three-dimensional deformation model is taken as an example, but those skilled in the art should understand that the three-dimensional face model may be constructed in other suitable manners, and details are not described herein.

In general, the three-dimensional face model may be represented by the following matrix containing three-dimensional positions of M points:

$$S = \begin{pmatrix} x_1 & x_2 & \dots & x_M \\ y_1 & y_2 & \dots & y_M \\ z_1 & z_2 & \dots & z_M \end{pmatrix} \qquad \text{Equation (1)}$$

The three-dimensional face model S constructed using the three-dimensional deformation model may be expressed by the following equation (2):

$$S = S_0 + \sum_{n_1=1}^{N_{id}} c_{id}^{n_1} S_{id}^{n_1} + \sum_{n_2=1}^{N_{exp}} c_{exp}^{n_2} S_{exp}^{n_2} \qquad \text{Equation (2)}$$

where $S_0$ indicates an average face model, $S_{id}^{n_1}$ indicates the $n_1$-th base function representing an identity, $c_{id}^{n_1}$ indicates a reconstruction coefficient of the base function, and $N_{id}$ indicates the total number of base functions representing identities; and $S_{exp}^{n_2}$ indicates the $n_2$-th base function representing an expression, $c_{exp}^{n_2}$ indicates a reconstruction coefficient of the base function, and $N_{exp}$ indicates the total number of base functions representing expressions. A set of reconstruction coefficients of the two types, that is, $c=(c_{id}, c_{exp})$, represents a shape parameter of the reconstructed three-dimensional face model.

As an example, the average face model $S_0$ and a total of 199 base functions representing identities ($N_{id}$=199) may be obtained from the paper "A 3D face model for pose and illumination invariant face recognition" by P. Paysan, R. Knothe, B. Amberg, S. Romdhani, T. Vetter et al. (Sixth IEEE International Conference on Advanced Video and Signal Based Surveillance, pp. 296-301, 2009). A total of 29 base functions representing expressions ($N_{exp}$=29) may be obtained from the paper "Facewarehouse: a 3d face expression database for visual computing" by C. Cao, Y. Weng, S. Zhou, Y. Tong, K. Zhou et al., (IEEE Trans. Vis. Comput. Graph., No. 3, Vol. 20, pp. 413-425, 2014).

In the three-dimensional face model construction step S101, the shape parameter of the three-dimensional face model as expressed by equation (2) may be determined based on information related to the face object in the two-dimensional image.

In a preferred embodiment, the above three-dimensional face model may be constructed based on a two-dimensional shape of the face object in the two-dimensional image that includes multiple key points. As an example, distances between projection points of the key points of the constructed three-dimensional face model in the two-dimensional space and the two-dimensional key points of the face object are minimized, which is described in detail below.

In general, the two-dimensional shape U of the face object may be represented by the following matrix containing two-dimensional positions of L key points:

$$U = \begin{pmatrix} u_1 & u_2 & \dots & u_L \\ v_1 & v_2 & \dots & v_L \end{pmatrix} \qquad \text{Equation (3)}$$

In the embodiment, in a two-dimensional image including a face object to be processed, the two-dimensional shape U of the face object as expressed by the above equation (3) has been marked or obtained in advance (for example, the above two-dimensional shape U has been obtained in advance by a pre-process).

Further, in a general three-dimensional face model (including the three-dimensional deformation model used in this embodiment), a position of a certain key point on a face, that is, an index of the key point among all three-dimensional points is fixed. Therefore, a subset of L key points among all the M three-dimensional points in the three-dimensional face model may be indicated by $S(:,d)$, where d is an L-dimensional vector which indicates indexes of three-dimensional key points corresponding to the L two-dimensional key points. Accordingly, the above subset $S(:,d)$ corresponds to the two-dimensional shape U of the face object in the two-dimensional image.

As described above, a shape parameter c of the three-dimensional face model may be determined by minimizing distances between projection points of the key points $S(:,d)$ of the constructed three-dimensional face model in the two-dimensional space and the L key points of the face object in the two-dimensional image.

Further, in the correspondence determination step S103, the correspondence between the constructed three-dimensional face model as expressed by equation (2) and the face object in the two-dimensional image may be determined. As an example, determining the correspondence may include determining a projection of the three-dimensional key points ($S(:,d)$) in the three-dimensional face model to the two-dimensional shape (U) of the face object.

Specifically, the projection may be determined according to the following equation (4):

$$U=f(S(:,d)) \qquad \text{Equation (4)}$$

where $f(\cdot)$ is a projection function representing a projection from a three-dimensional face model to a two-dimensional space. In a case of a weak perspective projection, $f(\cdot)$ may be expanded as follows:

$$f(S)=sPRS+t \qquad \text{Equation (5)}$$

where s indicates a scaling parameter, P indicates an orthogonal projection matrix $$\begin{bmatrix} 1 & 0 & 0 \\ 0 & 1 & 0 \end{bmatrix}$$

R indicates a rotation matrix determined by three rotation angles $\alpha, \beta, \gamma$ (corresponding to a transverse rotation posture, a tilt posture and a pitch posture of a head, respectively), and t indicates a two-dimensional translation parameter vector composed of $t_x$ and $t_y$. The parameters in the above equation (5) may be indicated by a vector $p=(s,\alpha,\beta,\gamma,t_x,t_y)^T$.

Therefore, the above equation (5) may be expressed as follows:

$$f(S)=pS \qquad \text{Equation (5)'}$$

Based on the above equation (4) to equation (5)', an optimization function may be constructed as expressed by the following equation (6):)

$$J(p, c) = \underset{p,c}{\mathrm{argmin}} \|(pS(:,d) - U)\|_F^2 \qquad \text{Equation (6)}$$

With equation (6), in a case that the distances between the projection points $pS(:,d)$ of the three-dimensional key points $S(:,d)$ in the two-dimensional space and the two-dimensional key points U of the face object are minimized, the optimized projection parameter p may be obtained together with the optimized shape parameter c of the three-dimensional face model.

It is to be understood by those skilled in the art that, although an order of the three-dimensional face model construction step S101 and the correspondence determination step S103 is shown in the flowchart 100 of FIG. 1, as described in the above example, in fact, the two steps may be performed in parallel or simultaneously. That is, it is possible to simultaneously determine the shape parameter c (that is, constructing the three-dimensional face model) and determine the projection parameter p (that is, determining the correspondence) by, for example, the optimization function expressed by the above equation (6).

Alternatively, the three-dimensional face model construction step S101 and the correspondence determination step S103 may be performed in an iteration manner. For example, initially, the shape parameter c of the three-dimensional face model may be set to 0. Thereafter, in the k-th iteration, the projection parameter $p^k$ may be determined according to an equation $$p^k = \underset{p}{\mathrm{argmin}} J(p, c^{k-1}), \qquad \text{Equation (6-1)}$$

and then the shape parameter $c^k$ may be determined according to an equation $$c^k = \underset{p}{\mathrm{argmin}} J(p^k, c), \qquad \text{Equation (6-2)}$$

and the iteration process is terminated when an iteration termination condition is satisfied. As an example, the iteration termination condition may be, for example, a condition that a difference between adjacent iterations for each of the two parameters is small enough, or a condition that the number of iterations reaches a preset total iteration number. Once the above projection parameter p is obtained, the posture of the three-dimensional face model (that is, the rotation matrix R, which may also represent the posture of the face object in the two-dimensional image) may be easily determined.

After the three-dimensional face model is constructed and the correspondence between the three-dimensional face model and the face object in the two-dimensional image is determined, then in the image feature extraction step S105, an area of interest of a key point in the two-dimensional image is determined using an area of interest near a corresponding key point in the three-dimensional face model based on the correspondence, and an image feature is extracted from the determined area of interest in the two-dimensional image as the image feature of the key point in the two-dimensional image. The extracted image feature can be used in processes described later with respect to FIGS. 2 and 3, such as processes in an increment establishing step S207 of FIG. 2 and an increment establishing step S307 of FIG. 3.

As an example, determining the area of interest in the two-dimensional image using the area of interest in the three-dimensional face model may include: projecting the area of interest in the three-dimensional face model to the two-dimensional image according to the correspondence, and taking the projection result as the area of interest in the two-dimensional image. In an example, the area of interest in the three-dimensional face model may include a portion of the three-dimensional face model that is within a sphere centered on the key point in the three-dimensional face model, that is, a subset of points on a three-dimensional curved surface which is the three-dimensional face model that are within the sphere. As an example, a radius of the sphere may be a radius properly set by experiments or the like in advance.

Accordingly, the area of interest in the two-dimensional image obtained by projection includes a set of projection points in the two-dimensional image of the respective points of the above-described subset of the three-dimensional face model. Due to variations in the positions of the key points and the face postures, the shapes of the projected areas of interest corresponding to respective key points may be different. However, compared with a circle area or a rectangular area near the key point that is directly determined on the two-dimensional image in the conventional method, the area of interest determined with the method in the embodiment conforms to the key point in the two-dimensional image in a better way, and it advantageously excludes interferences of a background area in the two-dimensional image since there is no background area in the three-dimensional face model.

As an example, in combination with the above equation (5), the area of interest Patch$^l$ in the two-dimensional image, which is obtained by projecting the area of interest of the l-th key point in the three-dimensional face model to the two-dimensional space, may be expressed as follows:

$$\text{Patch}^l = p^k S(:,d^l) \qquad \text{equation (7)}$$

Each of parameters in equation (7) has a similar meaning to a corresponding parameter in equation (5), where $S(:,d^l)$ indicates a subset of points in the area of interest near the l-th three-dimensional key point of the three-dimensional face model (for example, a subset of points on a three-dimensional curved surface which is the three-dimensional face model that are within a sphere centered on the l-th three-dimensional key point), and $d^l$ indicates indexes of the three-dimensional points in the above subset.

For an area of interest in a two-dimensional image that is determined, for example, in the above manner, an image feature may be extracted from the area of interest in any image feature extraction manner according to the conventional technology, to serve as an image feature of a corresponding key point. For example, the image feature may be extracted using any known feature operator such as Scale Invariant Feature Transform (SIFT) or Local Binary Feature (LBF). As an example, the SIFT feature operator Φ( ) may be used to extract a feature Φ(U) from the area of interest of the key points U in the two-dimensional image. As described above, since there is no background area in the three-dimensional face model, the area of interest in the two-dimensional image that is determined using the area of interest in the three-dimensional model is simple and clean, and accordingly, the feature is extracted from the area with high accuracy.

In the above example flow of the present embodiment, a face key point that is visible in the three-dimensional face model but not visible in the processed two-dimensional image (for example, the face key point which is not visible in the two-dimensional image due to a posture of the face object in the two-dimensional image) is not particularly considered. As an example, it is conceivable that in a two-dimensional image of a face of a human whose left face faces the camera, a key point on the right face (for example, a right canthus, and the like) may not be visible. Therefore, though the three-dimensional face model may include all L key points, the face object in the two-dimensional image may have only L1 key points visible (L1<L). Therefore, in a modified example, (L−L1) key points that are not visible in the two-dimensional image may be particularly considered in the calculation process.

In the modified example, a premise is that in determining the correspondence between the three-dimensional face model and the face object in the two-dimensional image, a three-dimensional posture of the face object (for example, the above rotation matrix R) is determined. Thereafter, when the area of interest of the key point in the two-dimensional image is determined using the area of interest near the corresponding key point in the three-dimensional face model, it may be judged whether the key point in the three-dimensional face model would be visible in the two-dimensional image according to the determined three-dimensional posture (for example, the above rotation matrix R), and the projection may be performed only for an area of interest near a key point that would be visible in the two-dimensional image.

As an example, a calculation method for judging whether a key point in the three-dimensional face model would be visible in the two-dimensional image may involve calculating an angle between a direction of a normal vector of the three-dimensional curved surface around each key point and a direction of a camera. If the angle is less than 90 degrees, the key point would be visible; otherwise, the key point would not be visible.

For example, for a certain key point in a three-dimensional face model, normal vectors of the three-dimensional curved surface for the point set around the key point in the three-dimensional face model may be first calculated, and an average of the normal vectors of the three-dimensional curved surface is calculated as a normal vector of the key point. After the normal vector is rotated based on the head posture (the rotation matrix R) of the three-dimensional face model, it may be determined whether the normal vector is directed to the camera direction or is away from the camera direction, which represents the key point would be visible or not in the two-dimensional image. For example, for a normal vector $N_l$ of a three-dimensional curved surface of the l-th key point, the directivity $v_l$ may be calculated according to the following equation (8):

$$v_l = N_l R_{12} \quad \text{Equation (8)}$$

where $R_{12}$ indicates first and second rows of the rotation matrix R. If the directivity $v_l$ calculated according to equation (8) is positive, the l-th key point would be visible in the two-dimensional image; otherwise, the l-th key point would not be visible in the two-dimensional image.

In a case that it is determined, for each of the key points, whether the key point is visible or not in the two-dimensional image, in the present modified example, projection may be performed for only the area of interest near a key point in the three-dimensional face model that would be visible in the two-dimensional image, and an feature is extracted from the area of interest in the two-dimensional image obtained by projection.

For a key point that is not visible in a two-dimensional image, a feature of a symmetrical point of the key point may be calculated using the symmetry of a human face. That is, for the key point that is not visible, an image feature of the visible symmetrical key point may be obtained in the above manner, and the obtained feature is taken as an image feature of the key point that is not visible. For example, a two-dimensional image of a face of a human whose left face faces the camera direction is taken as an example, a feature extracted for a visible left canthus may be taken as a feature of an invisible right canthus. Alternatively, a feature of an invisible key point may be directly set to 0, thereby preventing performance degradation of an algorithm caused by the inaccurate feature in a subsequent process.

In addition, if a key point that is not visible in the two-dimensional image is considered and it is determined whether each key point would be visible, for example, according to the above equation (7), the accuracy of constructing a three-dimensional face model in step S101 and the accuracy of determining the correspondence between the model and the face object in step S103 may be improved according to the visibility. More specifically, the above equation (6) may be improved by introducing a visibility vector V as follows:

$$J(p, c) = \underset{p,c}{\operatorname{argmin}} \|(pS(:, d) - U) \cdot V\|_F^2 \quad \text{Equation (6')}$$

where, • indicates an element-wise product.

It is to be noted that although the visibility of each key point is additionally considered in the present modified example, this additional consideration is only preferred but not necessary. In other words, even if the basic flow of the embodiment is performed without considering the visibility of each key point, the accuracy of the feature extraction can be improved compared with the conventional method of directly extracting the feature of the key point from the two-dimensional image.

The example flow of the image processing method according to an embodiment of the present disclosure is described above with reference to FIG. 1. Next, an example flow of the image processing method according to another embodiment of the present disclosure will be described with reference to FIG. 2.

Figure 2:
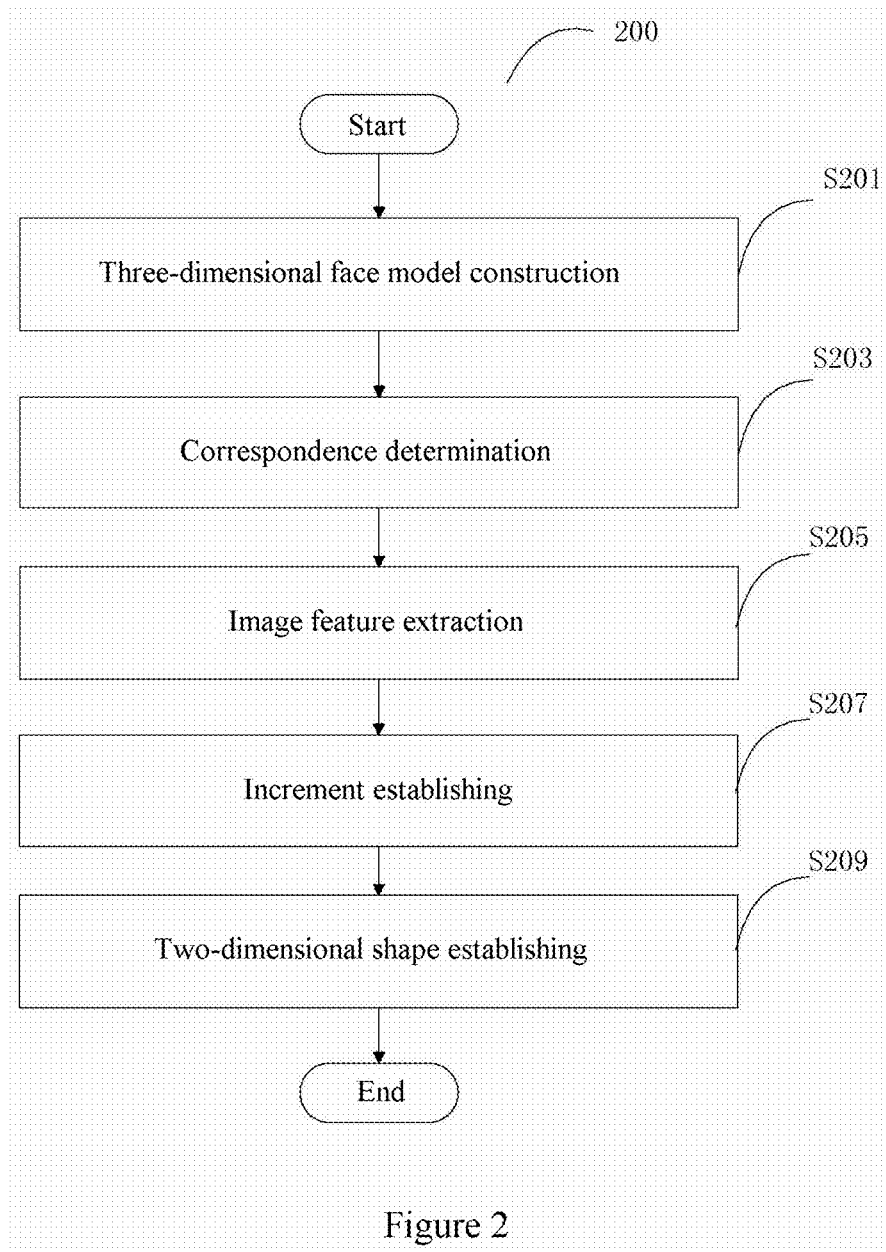
FIG. 2 is a flowchart schematically showing an example flow of an image processing method according to another embodiment of the present disclosure.

FIG. 2 is a flow chart schematically showing an example flow of an image processing method according to another embodiment of the present disclosure. As shown in FIG. 2, the image processing method 200 of the present embodiment differs from the image processing method 100 shown in FIG. 1 in that the image processing method 200 further includes an increment establishing step S207 and a two-dimensional shape establishing step S209. In the increment establishing step S207, a current increment of the two-dimensional shape of the face object is established using a regressor which is obtained in advance, based on the extracted image features of the key points. Accordingly, in the two-dimensional shape establishing step S209, a current two-dimensional shape of the face object is obtained based on a previously obtained two-dimensional shape of the face object and the current increment of the two-dimensional shape of the face object.

Except for the above difference, the remaining steps of the image processing method 200 in the present embodiment are substantially the same as the corresponding steps of the image processing method 100 shown in FIG. 1. Therefore, the example flow 200 in FIG. 2 may be described on the basis of the two-dimensional shape (or a set of the key points) U of the face object in the two-dimensional image and the corresponding three-dimensional face model S in the above example flow 100 described with reference to FIG. 1.

Specifically, after steps S201 to S205 which respectively correspond to steps S101 to S105 are performed, image features $\Phi^1(U^0)$ extracted from the determined areas of interest of the key points of the two-dimensional image may be obtained as image features of the two-dimensional image, where $U^0$ indicates a two-dimensional shape (that is, a set of key points) of the face object that is previously obtained or previously known (for example, previously marked or obtained by a pre-process).

Thereafter, in step S207, based on the extracted image features $\Phi^1(U^0)$ of the key points, the current increment $R^1(\Phi^1(U^0))$ of the two-dimensional shape of the face object may be established using a regressor $R^1(\ )$ that is obtained in advance, where the regressor $R^1(\ )$ may indicate a difference between the previously obtained two-dimensional shape $U^0$ of the face object and an actual two-dimensional shape, that is, to indicate a displacement adjustment that should be performed on the previously obtained two-dimensional shape $U^0$. In step S209, the previously obtained two-dimensional shape $U^0$ may be adjusted using the current increment $R^1(\Phi(U^0))$ of the two-dimensional shape thus obtained, so as to obtain a current two-dimensional shape $U^1$ more approximate to the actual two-dimensional shape of the face object:

$$U^1 = U^0 + R^1((\Phi^1(U^0))) \qquad \text{Equation (9)}$$

As an example, the regressor such as $R^1(\ )$ in the above equation (9) may be obtained in advance through training based on two-dimensional training images including face objects in which real or actual two-dimensional shapes are marked in advance. The regressor may be any one of various conventional regressors, such as a linear regressor, a support vector regressor, which is not described in detail here (by way of example rather than a limitation, an example flow of obtaining the above regressor will be described later with reference to FIG. 7 in detail).

As described in the example flow described above with reference to FIG. 1, with the image processing method in the embodiment of the present disclosure, the accuracy of extracting features of key points may be improved. Accordingly, in an example flow such as the one shown in FIG. 2, information of a previously known key point (that is, a previously known two-dimensional shape of the face object) may be modified using the accurately extracted image feature, thereby improving the accuracy of the position of the key point itself. By improving the accuracy or precision of the key point itself, it may advantageously improve the accuracy of subsequent image processes such as a two-dimensional face alignment process.

Next, an example flow of an image processing method according to still another embodiment of the present disclosure is described with reference to FIG. 3.

Figure 3:
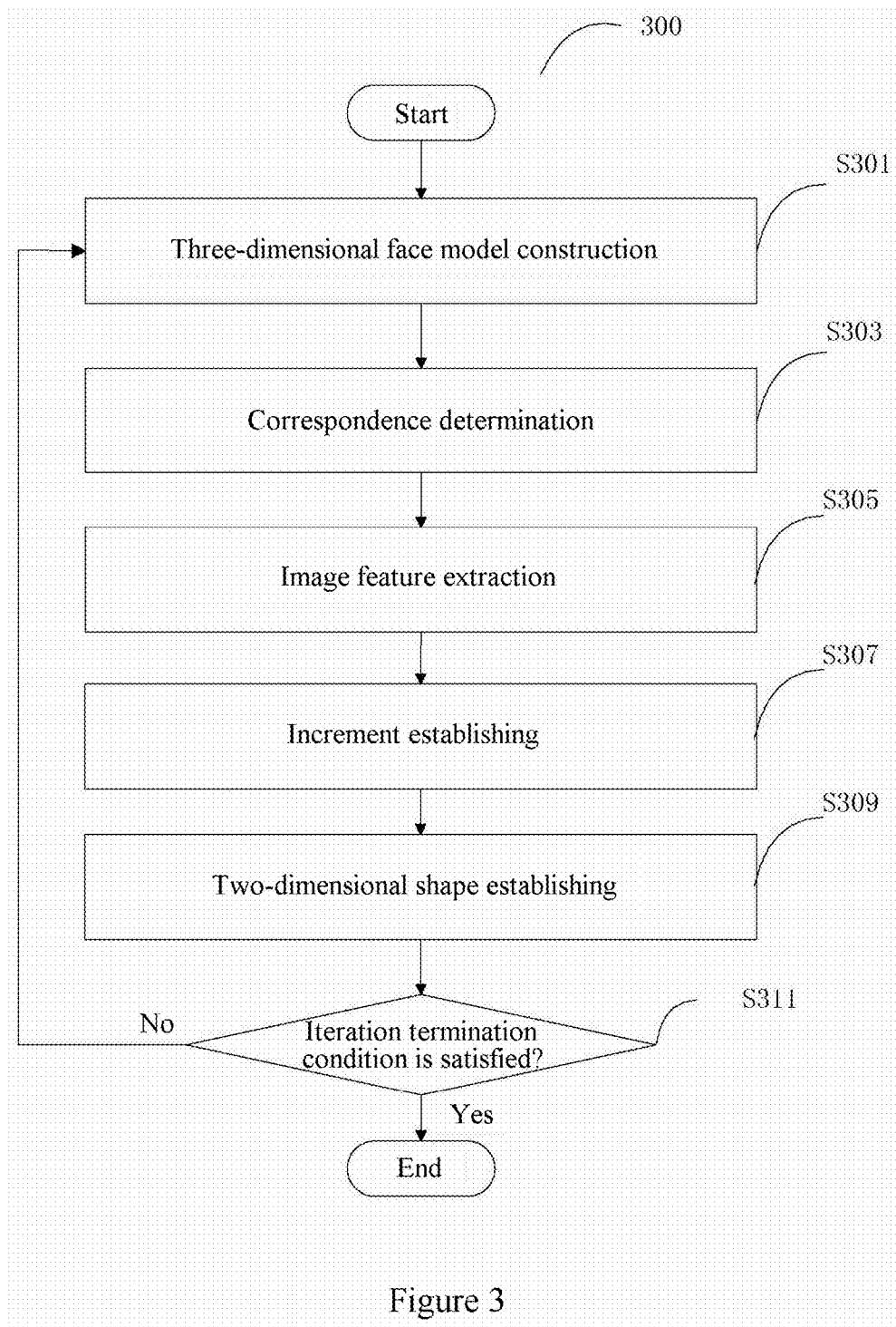
FIG. 3 is a flowchart schematically showing an example flow of an image processing method according to still another embodiment of the present disclosure.

FIG. 3 is a flowchart schematically showing an example flow of an image processing method according to still another embodiment of the present disclosure. As shown in FIG. 3, the image processing method 300 in the embodiment differs from the image processing method 200 shown in FIG. 2 in that the image processing method 300 further includes a step S311 for judging whether a predetermined condition (that is, an iteration termination condition) is satisfied. As long as this condition is not satisfied, a three-dimensional face model construction step S301, a correspondence determination step S303, an image feature extraction step S305, an increment establishing step S307, and a two-dimensional shape establishing step S309 which respectively correspond to steps S201 to S209 are iteratively performed until the predetermined condition is satisfied. As an example, the iteration termination condition may be a condition that a predetermined iteration number is reached, or a condition that a difference between certain parameters of adjacent iterations (for example, a difference between two-dimensional shapes of two adjacent iterations) is small enough, or the like.

Except for the above difference, the remaining steps of the image processing method 300 in the present embodiment are substantially the same as the corresponding steps of the image processing method 200 shown FIG. 2. In other words, in the present example flow 300, except for the step S311 for judging whether the iteration termination condition is satisfied, the processes in the other steps are substantially the same as those in steps S201 to S209, where the only difference is that a current iteration (the k-th iteration) is performed based on a result of a previous iteration (the k-lth iteration). Therefore, the example flow 300 shown in FIG. 3 may be described on the basis of the corresponding processes in the example flow 200 described above with reference to FIG. 2, and the description is mainly focused on the difference between the example flow 300 and the example flow 200 (or the difference between the example flow 300 and the example flow 100 described with reference to FIG. 1 which is used as the basis of the example flow 200).

Specifically, for the example flow 300 in the embodiment, initially (that is, in a case that the number of iterations is k=1), initial values may be set for related parameters. For example, initially, a two-dimensional shape of a two-dimensional image including a face object to be processed may be set to a two-dimensional shape of an average face image (that is, a result obtained by preliminarily aligning positions of key points on an average face image already known in the conventional technology with the face object in the image to be processed through a conventional pre-process), and similar to the example flow 100 described with reference to FIG. 1, a three-dimensional face model (an average face model) with a shape parameter of 0 in equation (2) is used as an initial three-dimensional model. Thereafter, in the current k-th iteration, related process is performed on the basis of the result of the previous iteration, that is, the (k−1)-th iteration.

For example, in the k-th iteration, in the three-dimensional face model construction step S301 and the correspondence determination step S303 of the example flow 300, a three-dimensional face model $S^k$ (a shape parameter $c^k$) and a correspondence (a projection parameter $p^k$) between the face model and the face object in the two-dimensional image in the current iteration may be obtained based on the two-dimensional shape $U^{k-1}$ of the face object obtained in the (k−1)-th iteration in a manner similar to that in steps S101 and S103 shown in FIG. 1 (for example, using equations (1) to (6)).

Next, in the image feature extraction step S305, based on the three-dimensional face model $S^k$ and the correspondence (the projection parameter $p^k$) between the three-dimensional face model and the face object in the two-dimensional image determined in this iteration, an area of interest of each key point in the three-dimensional face model $S^k$ is projected to the two-dimensional image, in a manner similar to that in step S105 shown in FIG. 1 (for example, using equation (7)), and the projection result is taken as an area of interest of a corresponding key point in the two-dimensional image (that is, an area of interest of the corresponding key point in the two-dimensional shape $U^{k-1}$ of the face object), and an image feature $\Phi^k(U^{k-1})$ is extracted from the area of interest.

Thereafter, in the increment establishing step S307, based on the image feature $\Phi^k(U^{k-1})$ extracted in this iteration, a current increment $R^k(\Phi(U^{k-1}))$ of the two-dimensional shape in this iteration is established using the previously obtained k-th regressor $R^k(\ )$, in a manner similar to that in step S207 shown in FIG. 2, which may indicate a difference or a displacement between the previously obtained two-dimensional shape $U^{k-1}$ of the face object and an actual two-dimensional shape of the face object.

Next, in the two-dimensional shape establishing step S309, the two-dimensional shape $U^{k-1}$ obtained in the previous iteration may be adjusted using the current increment $R^k(\Phi^k(U^{k-1}))$ of the two-dimensional shape obtained in this iteration according to the following equation (9'), so as to obtain a current two-dimensional shape $U^k$ which is more approximate to the actual two-dimensional shape of the face object:

$$U^k = U^{k-1} + R^k(\Phi^k(U^{k-1})) \qquad \text{Equation (9')}$$

Figure 7:
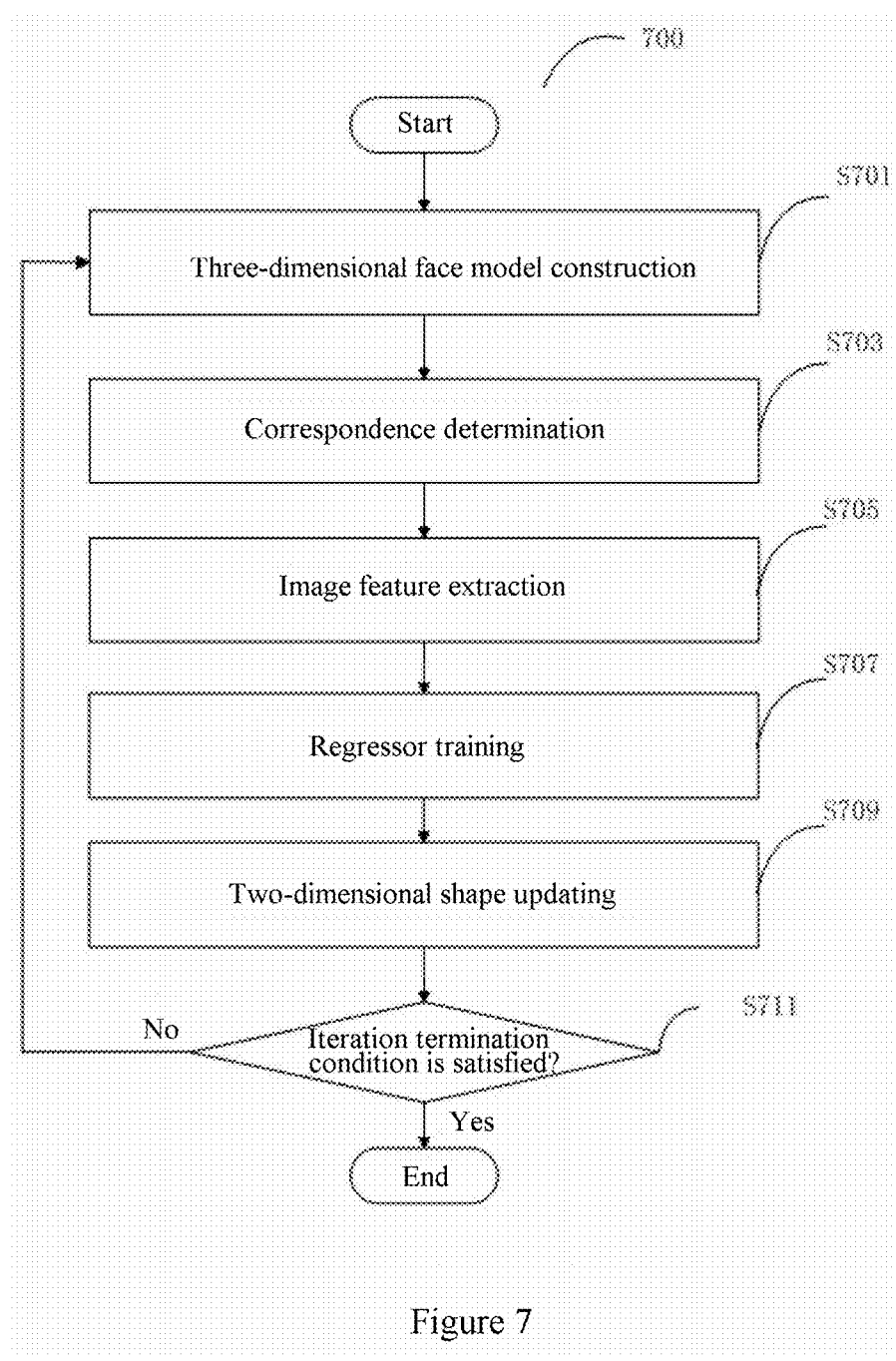
FIG. 7 is a flowchart schematically showing an example flow for obtaining a regressor used in the example shown in FIG. 2 or FIG. 3.

For example, the regressor $R^k()$ in the above equation (9') may be obtained in advance by training based on a two-dimensional training image including a face object in which a two-dimensional shape is marked in advance, and the regressor $R^k()$ may be any one of various conventional regressors, such as a linear regressor, a support vector regressor, which is not described in detail here (by way of example rather than a limitation, an example flow for obtaining the above regressor will be described later with reference to FIG. 7 in detail).

Thereafter, in step S311, it is judged whether the predetermined iteration termination condition is satisfied. If it is judged in step S311 that the condition is not satisfied, the flow may return to step S301, and the processes from step S301 to step S311 is performed again as the (k+1)-th iteration, until it is judged in step S311 that the iteration termination condition is satisfied. In a case that the iteration termination condition is satisfied, the process ends, and a two-dimensional shape of the face object is outputted, that is, final positions of the key points in the two-dimensional image are outputted, as a result of the processes.

As described in the example flow described above with reference to FIG. 2, with the image processing method in the embodiment of the present disclosure, in a case that information of a previously known key point (that is, a two-dimensional shape of the face object that is previously obtained, for example, by a preliminary pre-process) is modified using the accurately extracted image feature, the accuracy of the position of the key point itself may be improved. In the example flow 300 shown in FIG. 3, by iteratively performing the above improvement process, the accuracy or precision for the determined key point can be further improved as compared with the example flow 200 shown in FIG. 2.

Figure 4:
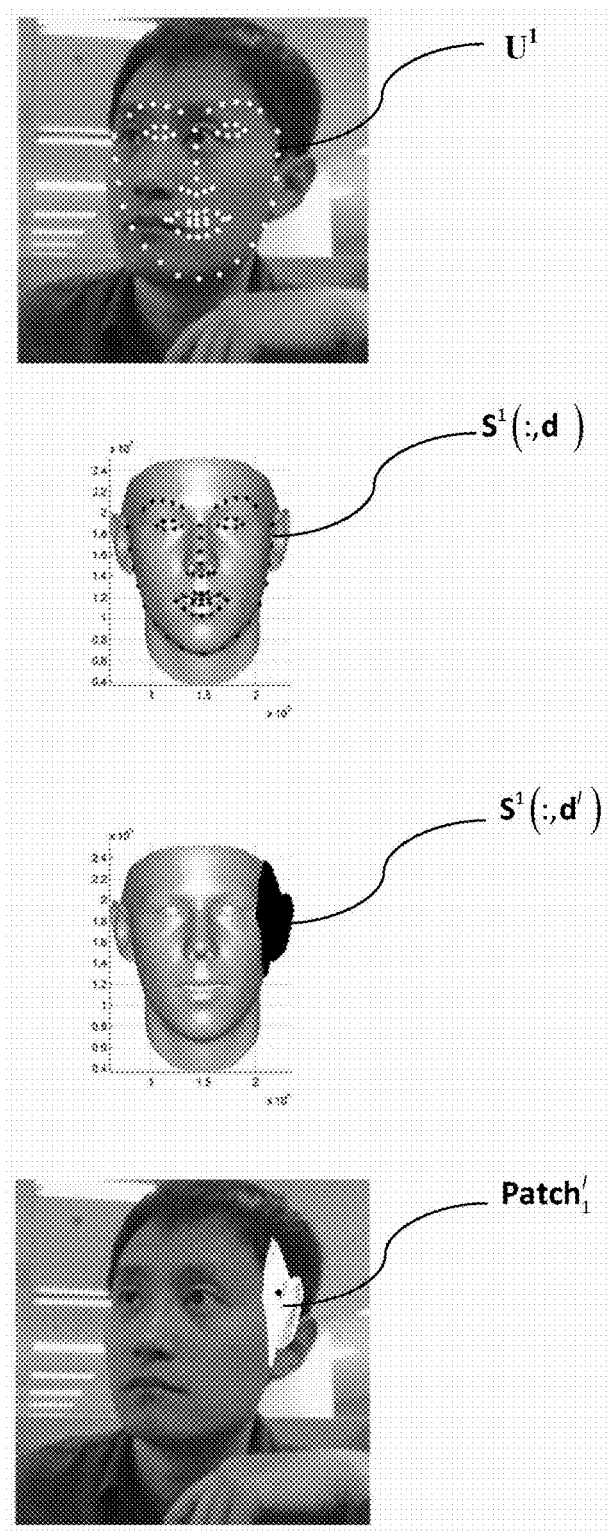
FIGS. 4 to 6 are explanatory diagrams for explaining the example flow of the image processing method shown in FIG. 3.
Figure 5:
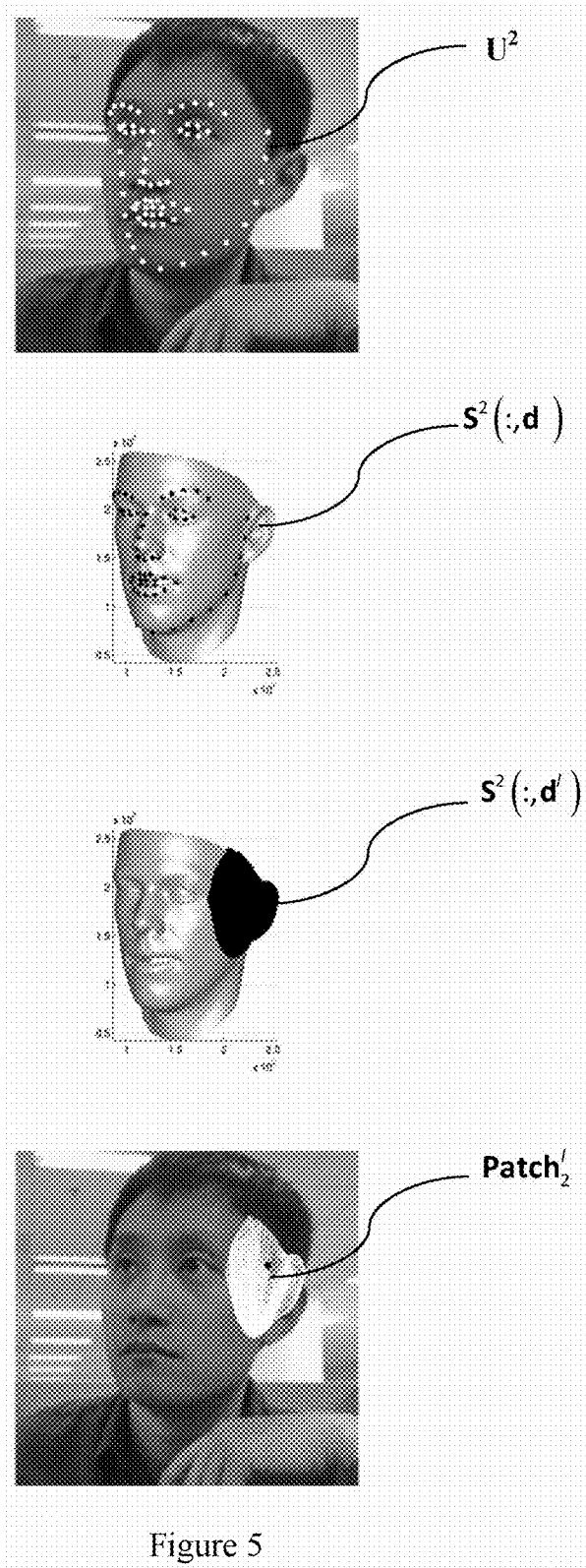
Figure 6:
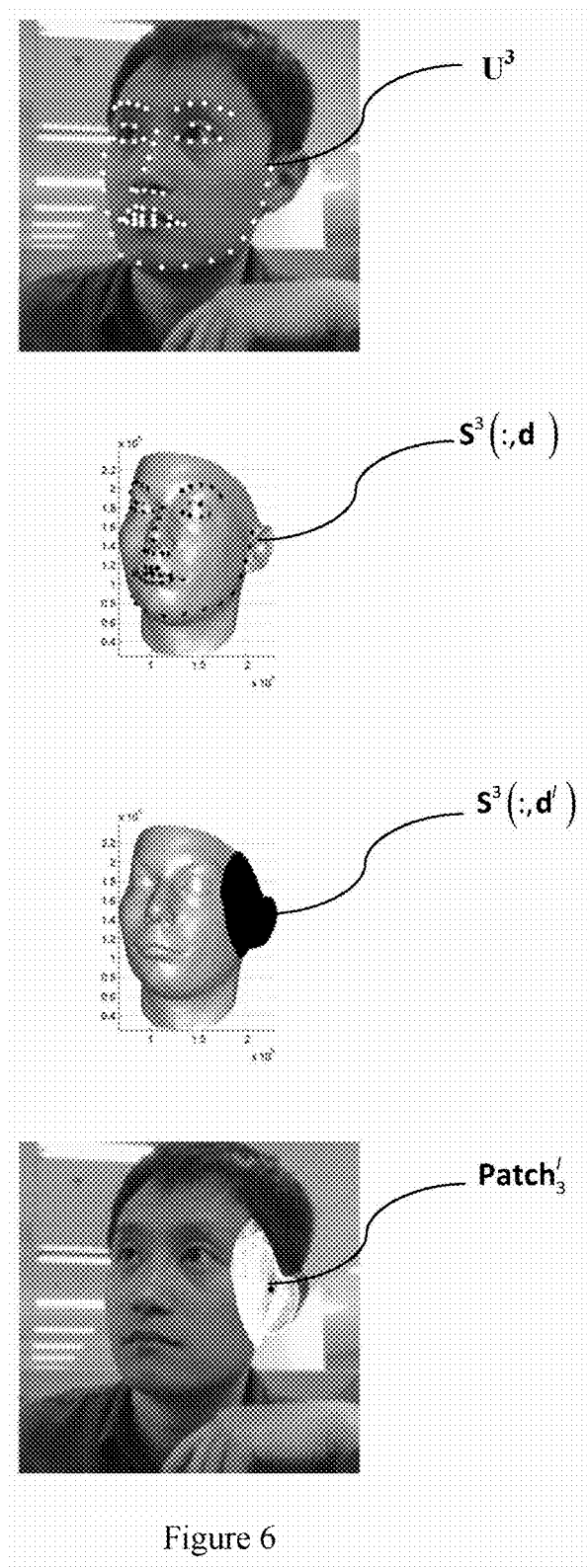

The processes performed in the example flow of FIG. 3 and their effects are described below with reference to FIGS. 4 to 6. FIGS. 4 to 6 are explanatory diagrams for explaining the example flow of the image processing method shown in FIG. 3.

As an example, FIGS. 4 to 6 respectively show cases of first to third iterations (that is, the number of iterations k=1, 2, 3) in an example of the example flow 300 in FIG. 3. In each of FIGS. 4 to 6, the four pictures from top to bottom sequentially show the following in a corresponding iteration: a two-dimensional image, and a two-dimensional shape or a set of key points $U^k$ of a face object in the two-dimensional image, which are shown by white dots; a three-dimensional model constructed based on the two-dimensional shape, and the set of three-dimensional key points $S^k(:d)$ thereon, which are shown by black dots; an area of interest $S^k(:d^1)$ of a certain key point, that is, the l-th key point (a first key point on the right side of a face outline in the figure), determined on the three-dimensional model, which is shown as a black area; and an area of interest $Patch_k^l$ of the key point in the two-dimensional image obtained based on the area of interest of the three-dimensional model, which is shown by white textures around a black point.

It can be clearly seen from FIG. 4 to FIG. 6 that with the image processing method in the embodiment of the present disclosure, the accuracy or precision of the key point itself can be improved, thereby improving the accuracy of aligning the key point with the face object in the two-dimensional image. Further, the constructed three-dimensional face model reflects the face object in the two-dimensional image more accurately as the iteration proceeds.

Example flows of the image processing method according to the embodiments of the present disclosure are described above with reference to FIGS. 1 to 6. In the example flows shown in FIGS. 2 and 3, the increment of the two-dimensional shape is established using a regressor that is trained in advance. Next, an example training flow for obtaining the regressor is specifically described with reference to FIG. 7. FIG. 7 is a flowchart schematically showing an example flow for obtaining the regressor used in the example of FIG. 2 or FIG. 3.

It is to be understood by those skilled in the art that the training flow for obtaining the regressor substantially corresponds to the testing process for applying the regressor (for example, the flow of the image processing method shown in FIG. 2 or FIG. 3). Therefore, description is mainly focused on a difference between the training flow and the testing flow, and for parts of the training flow which are the same as or similar to the corresponding parts of the testing flow, description is omitted or briefly made.

More specifically, an example training flow 700 for obtaining a regressor is similar to the example flow 300 of the image processing method shown in FIG. 3. As shown in FIG. 7, the example training flow 700 differs from the image processing method 300 shown in FIG. 3 mainly in that the increment establishing step S307 is replaced by a regressor training step S707. In addition, it is to be understood that the processing object in each step of the example training flow 700 involves training sample images (rather than a target image to be processed).

In order to train the regressor, it is required to provide a training data set, which may include, for example, N training sample images $I_i$ and positions of their respective ground truth key points, that is, $\{I_i, U_i^{gt}\}_{i=1}^{N}$. In addition, initial positions $\{U_i^0\}_{i=1}^{N}$ of key points on each training sample image $I_i$ may be set. As an example, initial positions of the key points on a training sample image may be, for example, as shown in the upper picture of FIG. 4, in which a two-dimensional shape of an average face image is used (that is, the two-dimensional shape of the average face image which is only preliminarily pre-processed to be preliminarily aligned with the face object in the training sample image). Further, initially, the initial shape parameter c of the three-dimensional face model $S_i^0$ as shown, for example in equation (2), may be set to 0. By training, cascaded regressors $\{R^k\}_{k=1}^{K}$ may be obtained, where K indicates the total number of iterations involved, for example, in the example training flow shown in FIG. 7.

In each iteration after the initial setting, a related process may be performed based on the result of a process in a previous iteration. For example, in the current k-th iteration, first, in steps S701 and S703, similar to steps S301 and S303 in FIG. 3, a three-dimensional face model in this iteration is constructed for each sample image $I_i$ based on the result in the (k−1)-th iteration, and a correspondence between the constructed three-dimensional face model and the face object is determined.

As an example, a projection parameter $p_i^k$ and a shape parameter $c_i^k$ of a three-dimensional model corresponding to the sample image in the current k-th iteration may be calculated based on the two-dimensional shape $U_i^{k-1}$ of the sample image $I_i$ obtained in the (k−1)-th iteration according to the following equation (10) that is similar to equation (6):

$$S_i^k = S_0 + \sum_{n_1=1}^{N_{id}} c_{id}^{n_1,k} S_{id}^{n_1} + \sum_{n_2=1}^{N_{exp}} c_{exp}^{n_2,k} S_{exp}^{n_2} \qquad \text{Equation (11)}$$

Alternatively, equation (10) may be modified in a similar manner to equation (6') by taking visibility of key points into consideration (in this case, the visibility of the key point is marked in the training sample image in advance), which is not repeated here. In addition, all other processes that may involve the visibility of key points may be modified in a similar manner to the above testing process, which is not repeated here.

Based on the shape parameter $c_i^k$ determined by the above equation (10), the three-dimensional face model $S_i^k$ of the sample image $I_i$ in the current iteration may be expressed by the following equation (11) which is similar to equation (2):

$$J(p_i^k, c_i^k) = \operatorname*{argmin}_{p,c} \|p_i^k S_i^k - U_i^{k-1}\|_F^2 \qquad \text{Equation (10)}$$

It is to be noted that on the right side of the above equation (11), for the sake of brevity, subscripts for indicating the sample image $I_i$ are not marked in an identity parameter $c_{id}^{n_1,k}$ and an expression parameter $c_{exp}^{n_2,k}$ in the shape parameter $c_i^k$, but those skilled in the art should understand that each sample image $I_i$ has its corresponding shape parameter.

Next, in step S705, similar to step S305 shown in FIG. 3, for each sample image $I_i$, an area of interest of a key point in the two-dimensional image is determined using an area of interest near a corresponding key point in the three-dimensional face model $S_i^k$, based on the correspondence (a projection parameter $p_i^k$) determined in step S703, and an image feature is extracted from the determined area of interest in the two-dimensional image as the image feature of the key point in the two-dimensional image. The extracted image feature can be used in processes in the regressor training step S707 as described later.

As an example, the area of interest in the three-dimensional face model may be projected to the two-dimensional image, and a projection result is taken as the area of interest in the two-dimensional image. In an example, the area of interest in the three-dimensional face model may include a portion of the three-dimensional face model that is within a sphere centered on the key point in the three-dimensional face model, that is, a subset of points on a three-dimensional curved surface of the three-dimensional face model that are within the sphere. Correspondingly, the area of interest in the two-dimensional image obtained by projection is a set of projection points in the two-dimensional image for the points of the above subset.

For example, referring to the above equations (5) to (7), the area of interest Patch$_{ik}^l$ in the two-dimensional image, which is obtained by projecting the area of interest of the l-th key point in the three-dimensional face model $S_i^k$ to the two-dimensional space, may be expressed as follows:

$$\text{Patch}_{ik}^l = p_i^k S_i^k(:,d_{ik}^l) \qquad \text{Equation (12)}$$

Each parameter in equation (12) has a similar meaning to a corresponding parameter in equation (7), where $S_i^k(:,d_{ik}^l)$ indicates a subset of $d_{ik}^l$ points in the area of interest near the l-th three-dimensional key point in the three-dimensional face model $S_i^k$ in the k-th iteration (for example, a subset of points on a three-dimensional curved surface of the three-dimensional face model that are within a sphere having a predetermined radius and being centered on the l-th three-dimensional key point), where $d_{ik}^l$ indicates indexes of the three-dimensional points in the above subset.

With respect to an area of interest Patch$_{ik}^l$ for each sample image $I_i$ thus obtained, the feature extraction function $\Phi^k(I_i, U_i^{k-1})$ may be correspondingly learned, that is, image features $\Phi^k(I_i, U_i^{k-1})$ of each area of interest are obtained.

Thereafter, in step S707, based on the extracted features $\Phi^k(I_i, U_i^{k-1})$ of the respective key points of the N sample images, i=1, 2, . . . N, the k-th stage regressor $R^k$ may be trained by the following equation (13):

$$R^k = \operatorname*{argmin}_{R} \sum_{i=1}^{N} \|(U_i^{gt} - U_i^{k-1}) - R(\Phi^k(I_i, U_i^{k-1}))\| \qquad \text{Equation (13)}$$

With the optimization of equation (13), the regressor $R(\Phi^k(I_i, U_i^{k-1}))$ which is constructed based on the features $\Phi^k(I_i, U_i^{k-1})$ of the key points of the N sample images may optimally represent displacement or increment adjustment that the two-dimensional shape of each sample image should be taken in this iteration. In other words, the meaning of equation (13) is that the displacement increment represented by the regressor $R(\Phi^k(I_i, U_i^{k-1}))$ may optimally represent a difference $(U_i^{gt} - U_i^{k-1})$ between an actual two-dimensional shape $U_i^{gt}$ and a two-dimensional shape $U_i^{k-1}$ obtained for each sample image in the (k−1)-th iteration, that is, a distance between the regressor $R(\Phi^k(I_i, U_i^{k-1}))$ and the above difference $(U_i^{gt} - U_i^{k-1})$ is minimized. As described above, the regressor $R^k$ itself may be any one of suitable conventional regressors, such as a linear regressor, a support vector machine regressor, or the like, and it may be trained according to any known techniques, which is not described in detail here.

Next, in step S709, for each sample image $I_i$, the increment $R(\Phi^k(I_i, U_i^{k-1}))$ of its two-dimensional shape may be constructed using the obtained regressor $R^k$, and the two-dimensional shape $U_i^{k-1}$ obtained in the previous iteration is adjusted based on the increment, such that the obtained current two-dimensional shape $U_i^k$ is more approximate to the actual two-dimensional shape:

$$U_i^k = U_i^{k-1} + R^k(\Phi^k(I_i, U_i^{k-1})) \qquad \text{Equation (14)}$$

Thereafter, in step S711, it is judged whether an iteration termination condition is satisfied. For example, the iteration termination condition may include a condition that a predetermined iteration number K is reached, a condition that a difference between two-dimensional shapes of adjacent iterations is less than a predetermined threshold, a condition that a difference between a current two-dimensional shape and an actual two-dimensional shape is less than a predetermined threshold, or the like. If it is judged in step S711 that the condition is not satisfied, the flow may return to step S701, and the processes from step S701 to step S711 is repeated until it is judged in step S711 that the iteration termination condition is satisfied. In a case that the iteration termination condition is satisfied, the training flow ends and cascaded regressors $\{R^k\}_{k=1}^{K}$ are obtained. Further, a feature operator in each iteration, that is, a set of feature extraction functions $\{\Phi^k\}_{k=1}^{K}$, is also obtained.

The example flow of the image processing method shown in FIG. 3 may be performed using the cascaded regressors $\{R^k\}_{k=1}^{K}$ and the set of feature extraction functions $\{\Phi^k\}_{k=1}^{K}$ obtained by the above example training flow.

Figure 8:
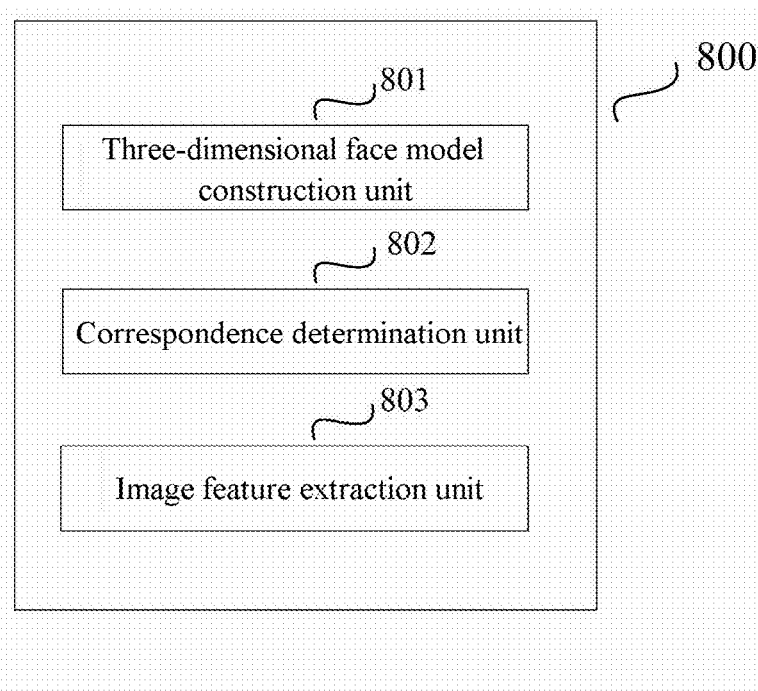
FIG. 8 is a schematic block diagram schematically showing an example structure of an image processing device according to an embodiment of the present disclosure.

Further, an image processing device is further provided according to the present disclosure. FIG. 8 is a schematic block diagram schematically showing an example structure of an image processing device according to an embodiment of the present disclosure.

As shown in FIG. 8, the image processing device 800 may include a three-dimensional face model construction unit 801, a correspondence determination unit 802, and an image feature extraction unit 803. The three-dimensional face model construction unit 801 is configured to construct a three-dimensional face model based on a face object in a two-dimensional image. The correspondence determination unit 802 is configured to determine a correspondence between the constructed three-dimensional face model and the face object in the two-dimensional image. The image feature extracting unit 803 is configured to determine, based on the correspondence, an area of interest of a key point in the two-dimensional image using an area of interest near a corresponding key point in the three-dimensional face model, and extract an image feature from the determined area of interest in the two-dimensional image as the image feature of the key point in the two-dimensional image.

The above image processing device and the units thereof may perform, for example, the example image processing method of the embodiment of the present disclosure described above with reference to FIG. 1 and operations and/or processing of the respective steps thereof, and can achieve similar effects, which are not repeated here.

Figure 9:
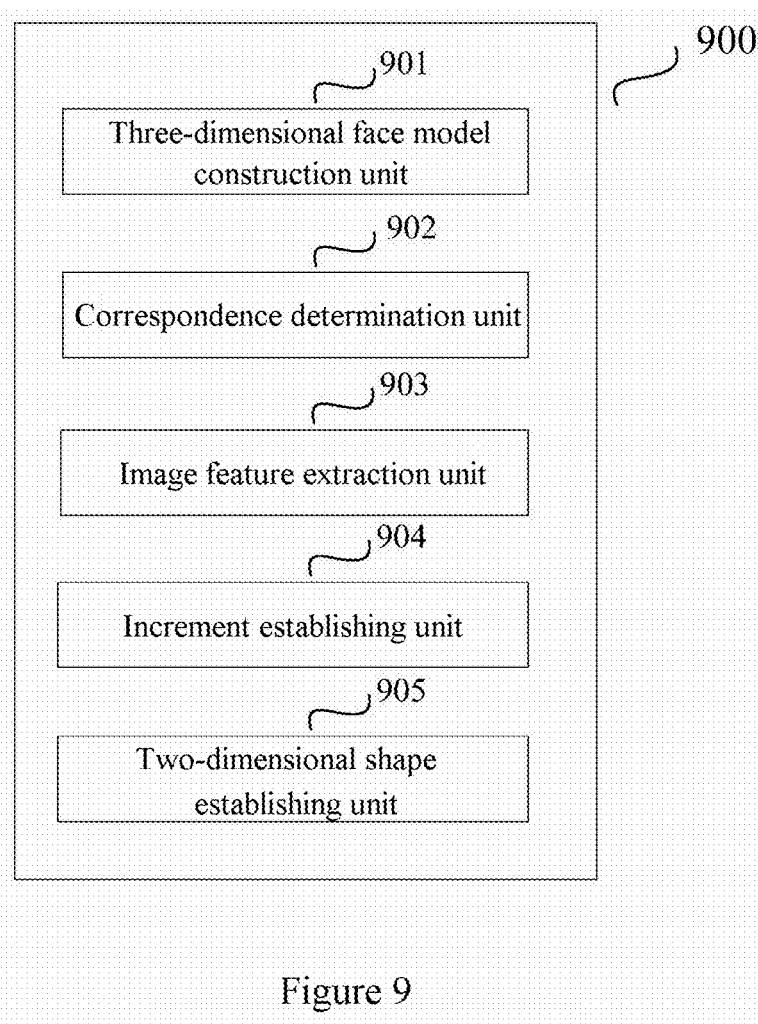
FIG. 9 is a schematic block diagram schematically showing an example structure of an image processing device according to another embodiment of the present disclosure.

FIG. 9 is a schematic block diagram schematically showing an example structure of an image processing device according to another embodiment of the present disclosure.

As shown in FIG. 9, the image processing device 900 differs from the image processing device 800 shown in FIG. 8 in that the image processing device 900 further includes an increment establishing unit 904 and a two-dimensional shape establishing unit 905, in addition to a three-dimensional face model construction unit 901, a correspondence determination unit 902, and an image feature extraction unit 903 which respectively correspond to the units 801 to 803. The increment establishing unit 904 is configured to establish, based on the extracted image features of the key points, a current increment of the two-dimensional shape of the face object using a regressor which is obtained in advance. Accordingly, the two-dimensional shape establishing unit 905 is configured to obtain a current two-dimensional shape of the face object based on a previously obtained two-dimensional shape of the face object and the current increment of the two-dimensional shape of the face object. Except for the above differences, the image processing device 900 in the present embodiment is identical to the image processing device 800 in FIG. 8, and thus the description thereof is not repeated here.

The above image processing device and the respective units thereof may perform, for example, the example image processing method of the embodiment of the present disclosure described above with reference to FIG. 2 and operations and/or processing of the respective steps thereof, and may achieve similar effects, which are not repeated here.

Figure 10:
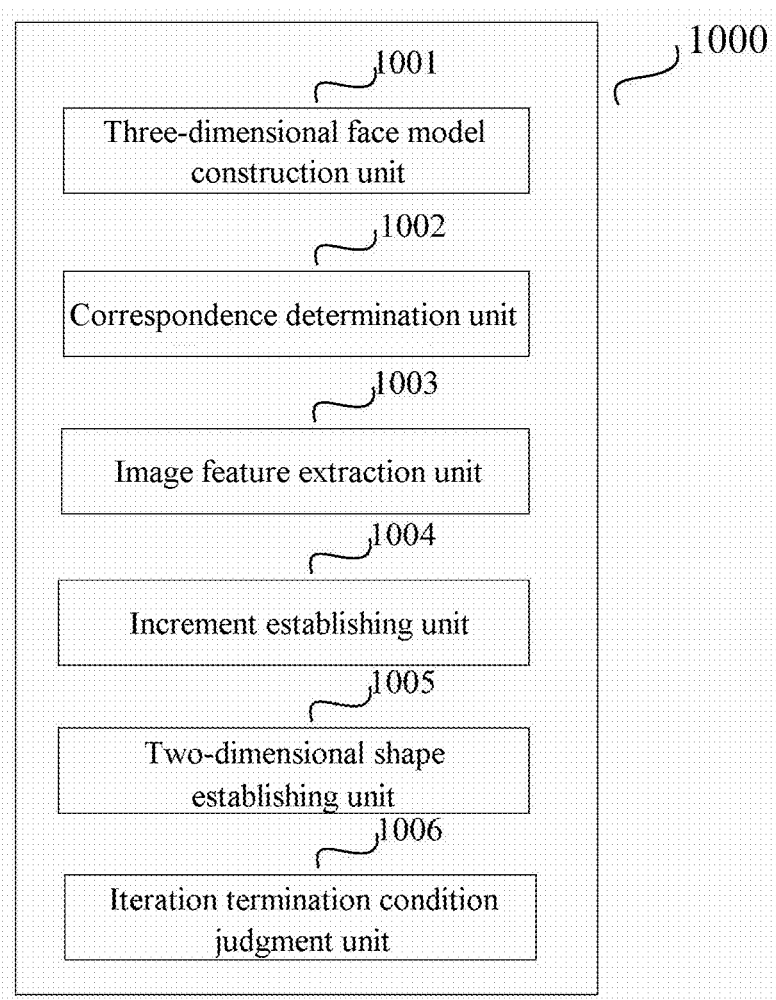
FIG. 10 is a schematic block diagram schematically showing an example structure of an image processing device according to still another embodiment of the present disclosure.

FIG. 10 is a schematic block diagram schematically showing an example structure of an image processing device according to still another embodiment of the present disclosure.

As shown in FIG. 10, the image processing device 1000 differs from the image processing device 900 in FIG. 9 in that the image processing device 1000 further includes an iteration termination judgment unit 1006 configured to judge whether a predetermined condition (that is, an iteration termination condition) is satisfied, in addition to a three-dimensional face model construction unit 1001, a correspondence determination unit 1002, and an image feature extraction unit 1003, an incremental establishing unit 1004, and a two-dimensional shape establishing unit 1005 which respectively correspond to the units 901 to 905. When the image processing device 1000 processes an image to be processed, if the iteration termination judgment unit 1006 judges that the iteration termination condition is not satisfied, the three-dimensional face model construction unit 1001, the correspondence determination unit 1002, the image feature extraction unit 1003, the increment establishing unit 1004 and the two-dimensional shape establishing unit 1005 iteratively perform their respective processes, until the iteration termination judgment unit 1006 judges that the iteration termination condition is satisfied. As an example, the iteration termination condition may be a condition that a predetermined iteration number is reached, a condition that a difference between certain parameters of adjacent iterations (for example, a difference between two-dimensional shapes of two adjacent iterations) is small enough, or the like. Except for the above differences, the image processing device 1000 in the present embodiment is identical to the image processing device 900 in FIG. 9, and thus the description is not repeated here.

The above image processing device and the respective units thereof may perform, for example, the example image processing method of the embodiment of the present disclosure described above with reference to FIG. 3 and operations and/or processing of the respective steps thereof, and may achieve similar effects, which are not repeated here.

Further, according to the present disclosure, an information processing device is further provided, which includes a processor configured to perform the image processing methods described above.

More specifically, in an embodiment, the processor may be configured to: construct a three-dimensional face model based on a face object in a two-dimensional image; determine a correspondence between the constructed three-dimensional face model and the face object in the two-dimensional image; determine, based on the correspondence, an area of interest of a key point in the two-dimensional image using an area of interest near a corresponding key point in the three-dimensional face model, and extract an image feature from the determined area of interest in the two-dimensional image as the image feature of the key point in the two-dimensional image. The extracted image feature can be used in processes described later with respect to preferred embodiments.

As an example, the processor may be further configured to construct the three-dimensional face model based on a two-dimensional shape of the face object in the two-dimensional image that includes multiple key points.

In a preferred embodiment, the processor may be further configured to: establish, based on the extracted image features of the key points, a current increment of the two-dimensional shape of the face object using a regressor which is obtained in advance; and obtain a current two-dimensional shape of the face object based on a previously obtained two-dimensional shape of the face object and the current increment of the two-dimensional shape of the face object.

In a preferred embodiment, the processor may be further configured to iteratively perform steps of constructing a three-dimensional face model, determining a correspondence, determining an area of interest, extracting an image feature, establishing a current increment and obtaining a current two-dimensional shape, until a predetermined condition is satisfied.

As an example, key points may include canthi, eyebrows, a nose tip, mouth corners and/or a chin center.

As an example, the regressor may be obtained through training based on two-dimensional training images including face objects in which two-dimensional shapes are marked in advance.

In a preferred embodiment, the processor may be further configured to determine the area of interest in the two-dimensional image by: projecting the area of interest in the three-dimensional face model to the two-dimensional image according to the correspondence, and taking a projecting result as the area of interest in the two-dimensional image.

As an example, the area of interest near the key point in the three-dimensional face model includes a portion of the three-dimensional face model that is within a sphere centered on the key point in the three-dimensional face model.

In a preferred embodiment, the processor may be further configured to: determine, in determining the correspondence between the three-dimensional face model and the face object in the two-dimensional object, a three-dimensional posture of the face object; and judge, in determining the area of interest in the two-dimensional image, whether the key point in the three-dimensional face model would be visible in the two-dimensional image according to the determined three-dimensional posture, where the projecting is performed only for an area of interest near a key point that would be visible in the two-dimensional image.

Figure 11:
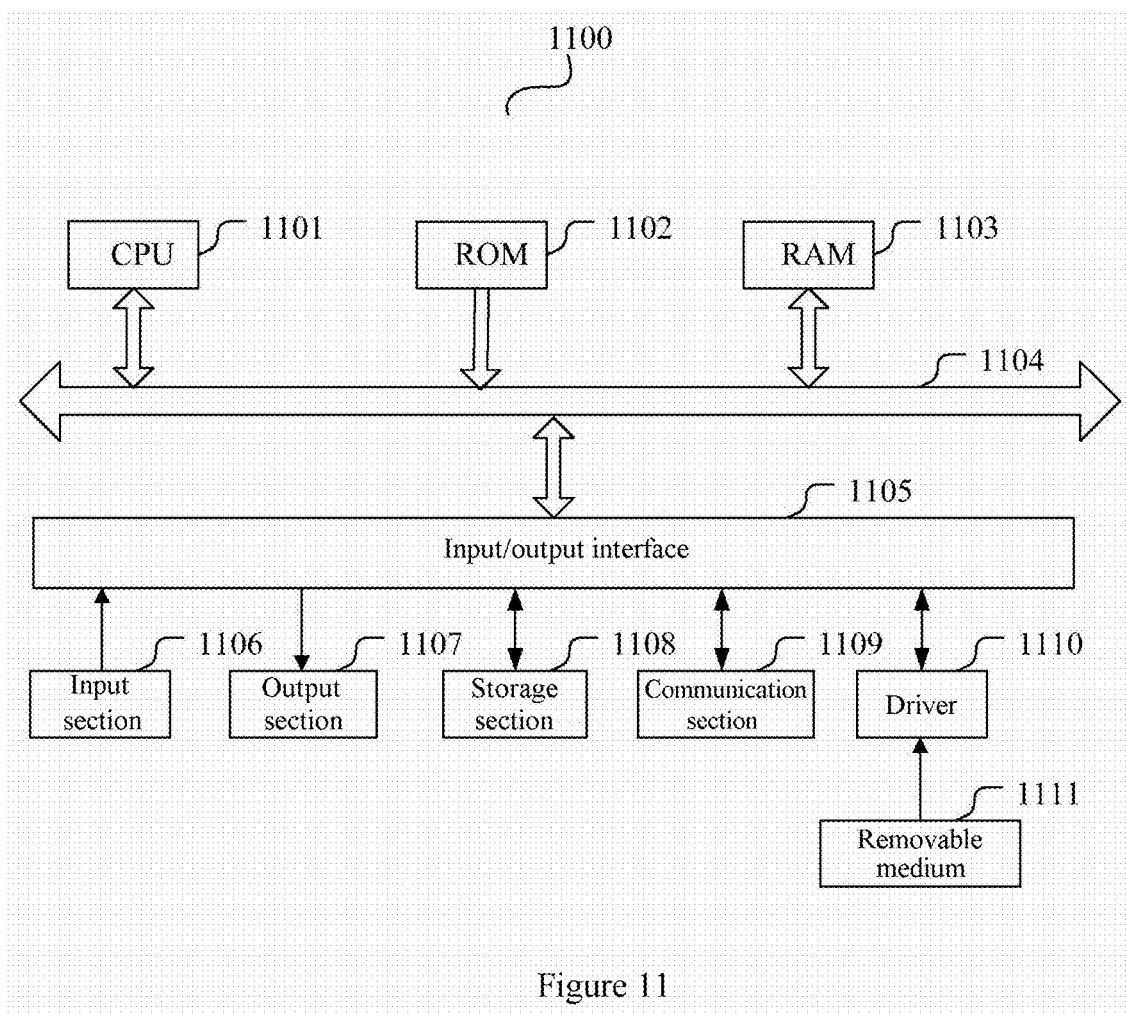
FIG. 11 is a schematic structural diagram of a hardware configuration which may be used to implement the image processing method and the image processing device according to the embodiments of the present disclosure.

FIG. 11 is a schematic block diagram showing a possible hardware configuration 1100 that can be used to implement an information processing device and an image processing method according to an embodiment of the present disclosure.

In FIG. 11, a central processing unit (CPU) 1101 executes various processes according to a program stored in a read-only memory (ROM) 1102 or a program loaded to a random access memory (RAM) 1103 from a memory section 1108. In the RAM 1103, the data required by the CPU 1101 for performing the various processes is stored. The CPU 1101, the ROM 1102 and the RAM 1103 are linked with each other via a bus 1104. An input/output interface 1105 is also linked to the bus 1104.

The following components are linked to the input/output interface 1105: an input section 1106 (including keyboard, mouse and the like), an output section 1107 (including displays such as a cathode ray tube (CRT), a liquid crystal display (LCD), a loudspeaker and the like), a memory section 1108 (including hard disc and the like), and a communication section 1109 (including a network interface card such as a LAN card, modem and the like). The communication section 1109 performs communication processes via a network such as the Internet. A driver 1110 may also be connected with the input/output interface 1105 as needed. A removable medium 1111, such as a magnetic disk, an optical disk, a magnetic optical disk and a semiconductor memory, may be mounted on the driver 1110 as needed, so that the computer program read therefrom is mounted onto the storage section 1108 as needed.

Moreover, a program product in which machine-readable instruction codes are stored is further provided according to the present disclosure. The instruction codes, when read and executed by a machine, cause the machine to perform the above image processing method according to the embodiment of the present disclosure. Accordingly, the storage medium for carrying the program product is also included in the present disclosure. The storage medium includes, but is not limited to, a magnetic disk, an optical disk, a magnetic optical disk, a semiconductor memory and the like.

That is, a storage medium is further provided according to the present disclosure, which stores machine readable instruction codes. The instruction codes, when read and executed by the machine, cause the machine to perform an image processing method.

The above storage medium may include, for example, but is not limited to, a magnetic disk, an optical disk, a magnetic optical disk, a semiconductor memory and the like.

In the above description of the embodiments of the present disclosure, features described and/or illustrated with respect to one embodiment may be used in one or more other embodiments in the same or similar manner, combined with features in another embodiment, or substituted for features in another embodiment.

Further, the methods of the embodiments of the present disclosure are not limited to being performed in the chronological order described in the specification or shown in the drawings, and may be performed in other chronological order, in parallel or independently. Therefore, the execution order of the methods described in the specification does not intends to limit the technical scope of the present disclosure.

Moreover, it is apparent that the various operational procedures of the above methods in the present disclosure may also be implemented in the form of computer-executable programs stored in various machine-readable storage mediums.

Moreover, the object of the present disclosure may also be achieved in the following way: providing the above storage medium storing the executable program codes directly or indirectly to a system or device, and a computer or a central processing unit (CPU) in the system or device reads and executes the above program codes.

In this case, as long as the system or device has a function of executing a program, embodiments of the present disclosure are not limited to the program, and the program may be in any form, for example, a target program, a program executed by an interpreter, or scripts provided to an operating system.

These machine-readable storage mediums include, but is not limited to, various memories and storage units; semiconductor devices; disk units such as optical disks, magnetic disks, and magneto-optical disks; as well as other media suitable for storing information and the like.

In addition, an information processing terminal of a customer may also implement various embodiments of the present disclosure by: accessing a corresponding website on the Internet, downloading and installing the computer program codes according to the present disclosure into the information processing terminal, and then executing the program.

In summary, according to the embodiments of the present disclosure, the following solutions are provided according to the present disclosure, but the present disclosure is not limited thereto.

At last, it is to be noted that, in the present disclosure, relationship terms such as "first" and "second" are used merely to distinguish one entity or operation from another entity or operation, and do not necessarily require or imply any such actual relationship or order between the entities or operations. In addition, the terms "include", "comprise" or any other variants are intended to be non-exclusive. Therefore, a process, method, article or device including multiple elements includes not only the elements but also other elements that are not enumerated, or also include the elements inherent for the process, method, article or device. In addition, in the absence of more restrictions, the elements defined by the sentence "including a . . . " do not exclude the presence of additional same elements in the process, method, article, or device that includes the elements.

Although the present disclosure is disclosed in the above description of the specific embodiments of the present disclosure, it is to be understood that various modifications, improvements or equivalents thereof of the present disclosure can be made by those skilled in the art within the spirit and scope of the appended claims. Such modifications, improvements, or equivalents should also be fall within the protection scope of the present disclosure.

The invention claimed is:

1. An information processing device, comprising:
a processor configured to:
construct a three-dimensional face model based on a two-dimensional shape of a face object in a two-dimensional image, said two-dimensional shape comprising a plurality of key points;
determine a correspondence between the constructed three-dimensional face model and the face object in the two-dimensional image;
for each of the plurality of key points, determine, based on the correspondence, an area of interest of a key point in the two-dimensional image using an area of interest near a corresponding key point in the three-dimensional face model, and extract an image feature from the determined area of interest in the two-dimensional image as the image feature of the key point in the two-dimensional image;
establish, based on the extracted image features of the key points, a current increment of the two-dimensional shape of the face object using a regressor which is obtained in advance, said increment indicating a displacement adjustment to be performed on positions of the key points comprised in the two-dimensional shape; and
obtain a current two-dimensional shape of the face object based on a previously obtained two-dimensional shape of the face object and the current increment of the two-dimensional shape of the face object,
wherein the processor is further configured to iteratively perform steps of constructing a respective three-dimensional face model, determining a respective correspondence, determining a respective area of interest, extracting a respective image feature, establishing a respective current increment and obtaining a respective current two-dimensional shape, until a predetermined iteration termination condition is satisfied.

2. The information processing device according to claim 1, wherein the key points comprise canthi, eyebrows, a nose tip, mouth corners and/or a chin center.

3. The information processing device according to claim 1, wherein the regressor is obtained through training based on two-dimensional training images including face objects in which two-dimensional shapes are marked in advance.

4. The information processing device according to claim 1, wherein the processor is further configured to determine the area of interest in the two-dimensional image by:

projecting the area of interest in the three-dimensional face model to the two-dimensional image according to the correspondence, and taking a projecting result as the area of interest in the two-dimensional image.

5. The information processing device according to claim 4, wherein the area of interest near the corresponding key point in the three-dimensional face model comprises a portion of the three-dimensional face model that is within a sphere centered on the corresponding key point in the three-dimensional face model.

6. The information processing device according to claim 4, wherein the processor is further configured to:
determine a three-dimensional posture of the face object in determining the correspondence between the three-dimensional face model and the face object in the two-dimensional object; and
judge, in determining the area of interest in the two-dimensional image, whether the corresponding key point in the three-dimensional face model would be visible in the two-dimensional image according to the determined three-dimensional posture, wherein the projecting is performed only for a particular area of interest near a particular key point that would be visible in the two-dimensional image.

7. An image processing method, comprising:
constructing a three-dimensional face model based on a two-dimensional shape of a face object in a two-dimensional image, said two-dimensional shape comprising a plurality of key points;
determining a correspondence between the constructed three-dimensional face model and the face object in the two-dimensional image;
for each of the plurality of key points, determining, based on the correspondence, an area of interest of a key point in the two-dimensional image using an area of interest near a corresponding key point in the three-dimensional face model, and extracting an image feature from the determined area of interest in the two-dimensional image as the image feature of the key point in the two-dimensional image;
establishing, based on the extracted image features of the key points, a current increment of the two-dimensional shape of the face object using a regressor which is obtained in advance, said increment indicating a displacement adjustment to be performed on positions of the key points comprised in the two-dimensional shape; and
obtaining a current two-dimensional shape of the face object based on a previously obtained two-dimensional shape of the face object and the current increment of the two-dimensional shape of the face object,
wherein steps of constructing a respective three-dimensional face model, determining a respective correspondence, determining a respective area of interest, extracting a respective image feature, establishing a respective current increment and obtaining a respective current two-dimensional shape are performed iteratively, until a predetermined iteration termination condition is satisfied.

8. The image processing method according to claim 7, wherein the key points include canthi, eyebrows, a nose tip, mouth corners and/or a chin center.

9. The image processing method according to claim 7, wherein the regressor is obtained through training based on two-dimensional training images including face objects in which two-dimensional shapes are marked in advance.

10. The image processing method according to claim 7, wherein determining the area of interest of the key point in the two-dimensional image using the area of interest near the corresponding key point in the three-dimensional face model includes:

projecting the area of interest in the three-dimensional face model to the two-dimensional image according to the correspondence, and taking a projecting result as the area of interest in the two-dimensional image.

11. The image processing method according to claim 10, wherein the area of interest near the corresponding key point in the three-dimensional face model includes a portion of the three-dimensional face model that is within a sphere centered on the corresponding key point in the three-dimensional face model.

12. The image processing method according to claim 10, wherein determining the correspondence between the three-dimensional face model and the face object in the two-dimensional image includes: determining a three-dimensional posture of the face object, and determining the area of interest of the key point in the two-dimensional image using the area of interest near the corresponding key point in the three-dimensional face model further includes: judging whether the corresponding key point in the three-dimensional face model would be visible in the two-dimensional image according to the determined three-dimensional posture, wherein the projecting is performed only for a particular area of interest near a particular key point that would be visible in the two-dimensional image.

13. A non-transitory recording medium storing a program, wherein the program, when executed by a computer, causes the computer to perform an image processing method, the method including:

constructing a three-dimensional face model based on a two-dimensional shape of a face object in a two-dimensional image, said two-dimensional shape comprising a plurality of key points;

determining a correspondence between the constructed three-dimensional face model and the face object in the two-dimensional image;

for each of the plurality of key points, determining, based on the correspondence, an area of interest of a key point in the two-dimensional image using an area of interest near a corresponding key point in the three-dimensional face model, and extracting an image feature from the determined area of interest in the two-dimensional image as the image feature of the key point in the two-dimensional image;

establishing, based on the extracted image features of the key points, a current increment of the two-dimensional shape of the face object using a regressor which is obtained in advance, said increment indicating a displacement adjustment to be performed on positions of the key points comprised in the two-dimensional shape; and obtaining a current two-dimensional shape of the face object based on a previously obtained two-dimensional shape of the face object and the current increment of the two-dimensional shape of the face object, wherein steps of constructing a respective three-dimensional face model, determining a respective correspondence, determining a respective area of interest, extracting a respective image feature, establishing a respective current increment and obtaining a respective current two-dimensional shape are performed iteratively, until a predetermined iteration termination condition is satisfied.

* * * * *